(12) United States Patent
Nishio et al.

(10) Patent No.: US 7,112,083 B2
(45) Date of Patent: Sep. 26, 2006

(54) CONNECTOR FOR CAMERA MODULE USE

(75) Inventors: Atsushi Nishio, Tokyo (JP); Takashi Kawasaki, Tokyo (JP); Satoru Karahashi, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/880,083

(22) Filed: Jun. 30, 2004

(65) Prior Publication Data

US 2005/0048829 A1    Mar. 3, 2005

(30) Foreign Application Priority Data

Aug. 27, 2003  (JP)  .......................... P. 2003-302980
Aug. 27, 2003  (JP)  .......................... P. 2003-303529

(51) Int. Cl.
*H01R 13/62*  (2006.01)

(52) U.S. Cl. .......................... 439/331; 439/73; 439/607

(58) Field of Classification Search .................. 439/73, 439/331, 607
See application file for complete search history.

(56) References Cited

U.S. PATENT DOCUMENTS

| | | | | |
|---|---|---|---|---|
| 4,130,327 A * | 12/1978 | Spaulding | .................... | 439/71 |
| 4,144,648 A * | 3/1979 | Grovender | .................... | 439/331 |
| 4,278,311 A * | 7/1981 | Scheingold et al. | .......... | 439/71 |
| 4,395,084 A * | 7/1983 | Conrad | ........................ | 439/331 |
| 4,511,201 A * | 4/1985 | Baker et al. | ................. | 439/260 |
| 4,560,217 A | 12/1985 | Siano | | |
| 4,652,973 A | 3/1987 | Baker et al. | | |
| 4,676,571 A | 6/1987 | Petersen et al. | | |
| 5,713,744 A * | 2/1998 | Laub | ............................ | 439/71 |
| 6,862,804 B1* | 3/2005 | Nishio et al. | .................. | 29/840 |
| 2005/0060842 A1* | 3/2005 | Ibaraki et al. | ................. | 16/295 |
| 2005/0153600 A1* | 7/2005 | Lu | ............................... | 439/607 |

(Continued)

FOREIGN PATENT DOCUMENTS

| | | |
|---|---|---|
| JP | 02071678 | 3/1990 |
| JP | 9-321261 | 12/1997 |
| JP | 2003-172859 | 6/2003 |

\* cited by examiner

*Primary Examiner*—P. Austin Bradley
*Assistant Examiner*—Larisa Tsukerman
(74) *Attorney, Agent, or Firm*—Whitham, Curtis, Christofferson & Cook, PC

(57) ABSTRACT

To provide a connector for camera module use capable of preventing a defective contact of the connector.

A connector for camera module use in which a camera module 12 is accommodated in a connector box 23, which is covered with a shield case, and engaged by an engaging member, the camera module 12 including: a solid image pickup element; a lens unit having a lens for guiding light to the solid image pickup element; and a lens holder by which the solid image pickup element is held, wherein a distance between the lens and the solid image pickup element is adjusted to a predetermined focal distance by the lens holder, and the connector for camera module use comprises a pushing member 21, and the pushing member 21 includes: an opening portion 21a formed at the center, the size of which is larger than that of the lens unit; leaf-spring-shaped elastic members 22, 22 . . . protruding along inner edges of the opening portion; and both side plates 21b, 21b on which an engaging hole 27 to be engaged with an engaging portion 25 formed on a circumferential side of the shield case 24 is formed, wherein the pushing member 21 is formed into a reverse U-shape when it is viewed from the front, and when the pushing member 21 is engaged with the shield case, it pushes the camera module body to a bottom face by elastic forces of the elastic members.

11 Claims, 5 Drawing Sheets

CONNECTOR FOR CAMERA MODULE USE

BACKGROUND OF THE INVENTION

1. Field of the Invention

The present invention relates to a connector for camera module use having a solid image pickup element. More particularly, the present invention relates to a connector for camera module use by which the camera module can be stably connected.

2. Description of the Related Art

Concerning the conventional CMOS camera module, as shown in FIG. 5 which is an appearance view of the camera module, the camera module 1 includes a lens holder 3, wherein the lens holder 3 is composed of a holder base 4, the shape of which is a substantially rectangular parallelepiped, and a lens joining portion 5, the shape of which is a substantially hollow cylinder, which is provided at the center of an upper face of the holder base 4. In the camera module, the sensor 6 is accommodated which is composed of a solid image pickup element such as CMOS, the shape of which is a rectangular parallelepiped smaller than the holder base 4. The lens unit 2 is forged into a substantially cylindrical shape, the outer diameter of which is substantially the same as that of the lens joining portion 5 of the lens holder 3. The lens unit 2 is joined to the lens holder 3 by the screw type fitting system.

In this camera module 1, first, the sensor 6 is bonded and fixed inside of the lens holder 3, and the lens unit 2 is screwed to the joining portion 5 of the lens holder 3 and the focus is adjusted. Then, an adhesive agent is applied so as to fix the lens unit 2 to the lens holder 3. In this connection, protrusions provided on the joining portion 5 of the lens holder 3 are formed later, so that the shield cap 7 can be fixed with pressure for reinforcing the shield. However, as described later, since the whole is shielded by the shield case when the connector for camera module use is used as described later, the shield cap 7 may be omitted. (For example, refer to JP-A-2003-172859 (Pages 3 and 4, FIG. 1)).

An example of the conventional connector for camera module use, in which the camera module is accommodated, is shown in FIG. 6. The connector 11 for camera module use is composed in such a manner that the connector box 13 shown in FIG. 7(a) to which the connector pins 15a, 15b are attached is covered with the shield case 14 shown in FIG. 7(b) so that the connector box 13 can be electromagnetically shielded and integrated into one body. The camera module 12 is accommodated and fixed in this connector box 13.

In the conventional connector 11 for camera module use composed as described above, as shown in FIG. 8, the connector box 13 is connected with the pin 15b and the contact 16 of the camera module 12 to be accommodated. Concerning the lock mechanism, the connector 11 for camera module use is engaged and fixed by the lance (movable contact piece) 17 by the fixing system. The terminals of the connector 11 for camera module use are mounted on a board (not shown) for camera module use, and the camera module 12 is accommodated and incorporated into a cellular phone (not shown) and other devices. In this case, in order to prevent the camera module from being detached by a shock given from the outside, the camera module is completely locked so that it can not be opened and closed.

SUMMARY OF THE INVENTION

However, in the conventional connector for camera module use, the following problems may be encountered. As shown in FIG. 8, the connector for camera module use is engaged and fixed by the fixing system (It is impossible to conduct an opening and closing motion in the fixing system.) conducted by the lance (movable contact piece) 17. Therefore, gaps formed between both of them in the horizontal direction can be completely closed and fixed. However, gaps formed in the vertical direction cannot be closed for structural reasons. Because of the gaps formed in the vertical direction, the camera module 12 is vertically moved, and the pin 15b and the contact 16 are deflectively connected with each other. As a result, it is impossible to pick up and transmit a clear images.

Therefore, when the camera module is engaged and fixed to the connector side, it is necessary to avoid a vertical motion caused by a gap formed in the vertical direction so as to enhance the productivity. Therefore, technical problems to be solved are caused. It is an object of the present invention to solve the problems.

The present invention has been proposed to accomplish the above object. The invention provides a connector for camera module use in which a camera module is accommodated in a connector box, which is covered with a shield case, and engaged by an engaging member, the camera module including: a solid image pickup element; a lens unit having a lens for guiding light to the solid image pickup element; and a lens holder by which the solid image pickup element is held, wherein a distance between the lens and the solid image pickup element is adjusted to a predetermined focal distance by the lens holder, the connector for camera module use comprising a pushing member, the pushing member including:

an opening portion formed at the center of an upper face of the pushing member, the shape of the upper face of the pushing member being substantially the same as that of the shield case, the size of the opening being larger than that of the lens unit; leaf-spring-shaped elastic members protruding along inner edges of the opening portion; and both side plates on which an engaging hole to be engaged with an engaging portion formed on a circumferential side of the shield case is formed, wherein the pushing member is formed into a reverse U-shape when it is viewed from the front, and when the pushing member is engaged with the shield case, it pushes the camera module body to a bottom face by elastic forces of the elastic members.

The invention provides a connector for camera module use in which a camera module is accommodated in a connector box, which is covered with a shield case, and engaged by an engaging member, the camera module including: a solid image pickup element; a lens unit having a lens for guiding light to the solid image pickup element; and a lens holder by which the solid image pickup element is held, wherein a distance between the lens and the solid image pickup element is adjusted to a predetermined focal distance by the lens holder, the connector for camera module use comprising a pushing member, wherein the pushing member includes elastic members, arranged at corner positions on a diagonal line of the shield case, the length of the elastic members is substantially the same as the length of one side of the shield case, the cross section of each elastic member is an L-shape, the elastic members are vertically arranged like a pole as a portion of the shield case, the elastic members protrude along the lens unit side, an engaging member engaged with the engaging portion of the shield case is formed at a forward end portion of the pushing member, after the camera module has been assembled, the pushing member is bent from a base end so that the pushing member can be engaged and tightly contacted with the shield case side and the elastic members can push a bottom face of the camera module body.

In the connector for camera module use of the present invention, the engaging protrusions are formed on a circumferential side of the shield case of the connector for camera module use in which the connector box is covered with the shield case, and the pushing member, the shape of which is a reverse U-shape when it is viewed from the front, on both sides of which the engaging holes to be engaged with the engaging protrusions are formed, having an opening portion on the roof, a plurality of leaf-spring-shaped elastic members being formed at the inner edges of the opening portion, is engaged with the shield case in such a manner that the pushing member covers the shield case. Therefore, the plurality of leaf springs provided at the inner edges of the opening portion uniformly push the camera module to the bottom face. Accordingly, the gaps formed between both of them can be completely closed, and the pins and the contacts can be in excellent contact with each other.

Alternatively, the pushing member is formed by utilizing the same member as that of the shield case in such a manner that the pushing member, the cross section of which is an L-shape, which is vertically provided at each corner of the diagonal line on the roof, is attached to the circumferential side of the shield case while it is bent at the base end at the time of assembling. Due to this structure, the leaf springs equally push the camera module to the bottom face. Therefore, the gaps formed between both of them can be completely closed, and the pins and the contacts can be in excellent contact with each other by the simple structure.

The present invention has been proposed to accomplish the above object. The invention provides a connector for camera module use in which a camera module is accommodated in a connector box and engaged by an engaging member, the camera module including: a solid image pickup element; a lens unit having a lens for guiding light to the solid image pickup element; and a lens holder to which the lens unit and the solid image pickup element are attached, the connector for camera module use comprising: the engaging member formed on an inner wall face of the connector and engaged with an engaging face of the camera module; and a pushing member arranged together with the engaging member, a forward end portion of the pushing member being bent, the pushing member being engaged with an engaging face of the camera module so that the pushing member can push the camera module to a bottom face of the connector.

The invention provides a connector for camera module use, herein the engaging member is composed of a lance (movable contact piece) for preventing the camera module from being disengaged, the engaging member is engaged with an engaging face of the camera module and pushes a side of the camera module in the horizontal direction by an elastic force, and the pushing member pushes the camera module to a bottom face in the vertical direction.

In the connector for camera module use of the present invention, the pushing member, the forward end portion of which is bent so that the pushing member can be given an elastic force, is arranged on the side of the lance (movable piece) formed on the inner wall face of the connector. Therefore, the camera module is pushed in the horizontal direction and also in the bottom face direction. Accordingly, the gaps formed between the camera module and the connector in the vertical direction can be completely closed and tightly contacted with each other. Therefore, the camera module can not be moved upward and downward, and the pins and contacts can be in excellent contact with each other.

Alternatively, in the connector for camera module use of the present invention, the lance provided on the inner wall face of the connector is engaged with the engaging face of the camera module, and the camera module is pushed by an elastic force of the lance mainly in the horizontal direction. The forward end portion of the bent portion of the pushing member provided in the lance is engaged with the engaging face of the camera module, and the engaging face of the camera module is pushed by an elastic force of the pushing member to the bottom face in the vertical direction. Therefore, the gap (rattle) between the camera module and the connector in the vertical direction can be completely closed, and the pins and contacts can be in excellent contact with each other.

In the invention of this patent application, the pushing member engaged with the engaging portions which are formed on both sides of the connector body for camera module use, the pushing member covering and coming into close contact with the connector for camera module use, is added as a different part. The pushing member pushes the camera module to the bottom face by a plurality of leaf springs provided at the inner edges of the opening portion. Therefore, the gaps formed between both of them in the vertical direction can be closed, and the camera module can be stably set at a predetermined position, so that a vertical motion of the connector for camera module use can be suppressed, and the pins and the contacts of the connector mechanism can be excellently contacted with each other. Accordingly, clear images can be picked up at all times.

In the invention, the pushing member is not a different part but a pole-shaped part composed of a portion of the shield case. Therefore, the structure of the pushing member is simple. Accordingly, in addition to the advantage, the manday and the costs of parts can be reduced. Accordingly, the weight and size of the camera module can be further reduced. The present invention can provide the most appropriate mechanism used for a small camera module.

According to the invention of the present patent application, the pushing member is arranged on the side of the lance which is formed on the inner wall face of the connector for camera module use. Therefore, the gaps formed between the camera module and the connector for camera module use can be closed, pushed and tightly contacted with each other by the pushing member. Accordingly, a movement of the camera module in the vertical direction can be completely avoided, and the pins and contacts are excellent contact with each other. Since the camera module is stably held in the connector for camera module use in this way, clear images can be picked up at all times.

According to the invention, the camera module is mainly pushed in the horizontal direction by the lance. On the other hand, the camera module is pushed to the bottom face by the pushing member of the half-lock system. Therefore, the gaps between the camera module and the connector can be completely avoided, and the same effect can be provided. Further, since the camera module and the pushing member are connected to each other by the half lock system, attaching and detaching of the camera module can be conducted.

DESCRIPTION OF THE PREFERRED EMBODIMENTS

EMBODIMENT 1

Referred to FIGS. 1 and 2, an embodiment of the present invention will be described in detail as follows.

Figure 1:
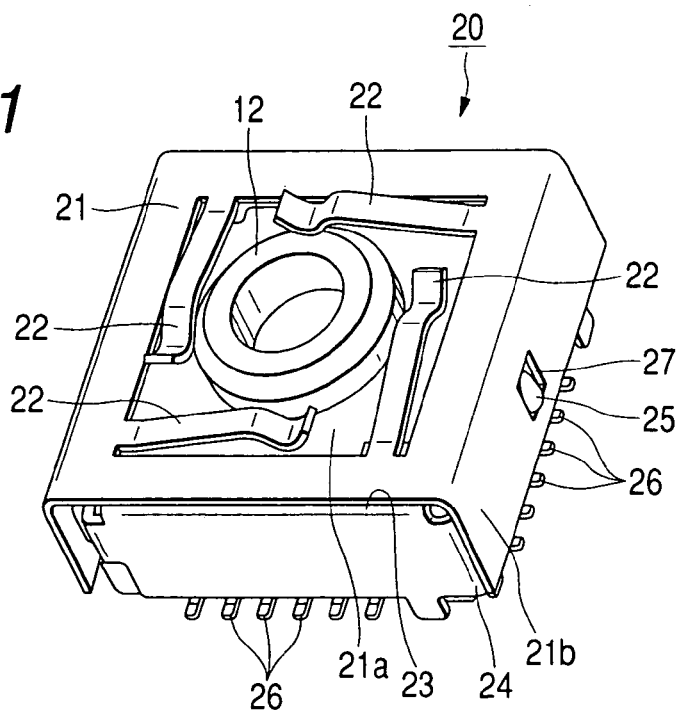
FIG. 1 is an overall perspective view of the connector for camera module use of the first embodiment of the present invention.

FIG. 1 is an overall perspective view of the connector for camera module use of the first embodiment of the present invention.

Figure 2:
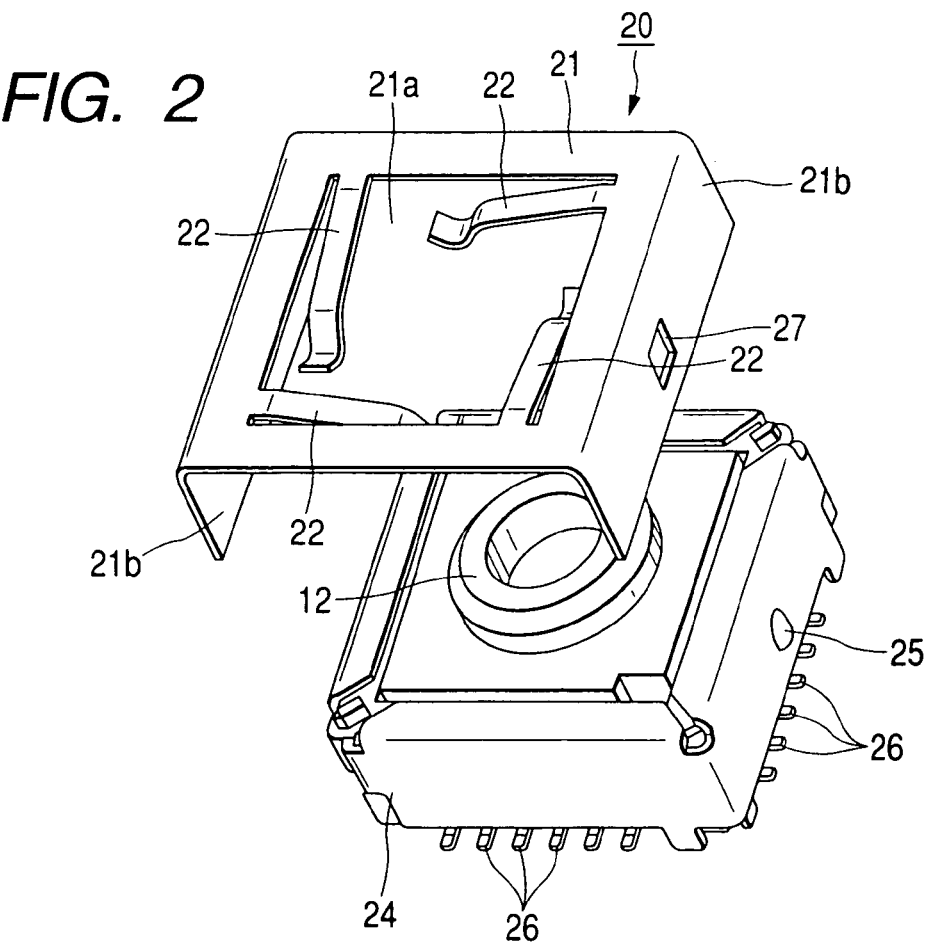
FIG. 2 is an assembled exploded perspective view of the connector for camera module use shown in FIG. 1.

FIG. 2 is an assembled exploded perspective view of the connector for camera module use shown in FIG. 1.

The connector 20 for camera module use shown in FIGS. 1 and 2 is composed as follows. The connector box 23 to which the connector pins 26, 26 . . . are attached is covered with the shield case 24 made of metal, and the protruding engaging portions 25, 25 provided on the circumferential side of the shield case 24 are engaged with the engaging holes 27, 27 which are open onto both side plates 21b, 21b of the pushing member 21. In this way, the pushing member 21 is engaged with the shield case 24.

The pushing member 21 is formed into a shape corresponding to the connector box 23, for example, by means of press forming. The entire shape of the pushing member 21 is formed into a reverse U-shape when it is viewed from the front side. On both side plates 21b, 21b, the engaging holes 27, 27 are formed. The opening portion 21a is provided on the roof of the pushing member 21 in such a manner that a big hole is made on the roof. Further, at the inner edges of the opening portion 21a, the leaf springs 22, 22 . . . are provided being extended from the inner edges. In the example, shown in the drawing, the number of the leaf springs 22, 22 . . . is four, that is, four leaf springs 22, 22 . . . are provided in all directions. However, the number of the leaf springs is not necessarily limited to the above specific embodiment and can be appropriately changed. For example, when the number of the leaf springs is increased, an intensity of the pushing force of the pushing member 21 given to the lower side can be increased. Therefore, an intensity of the force to hold the camera module 12 can be enhanced, and the occurrence of rattle of the above camera module 12 can be accurately suppressed.

Figure 5:
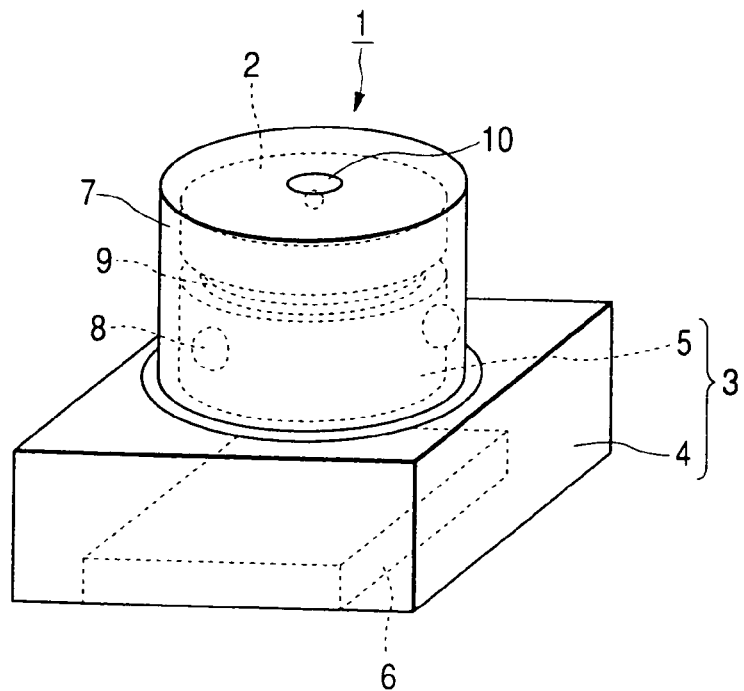
FIG. 5 is a perspective appearance view showing a conventional camera module.
Figure 6:
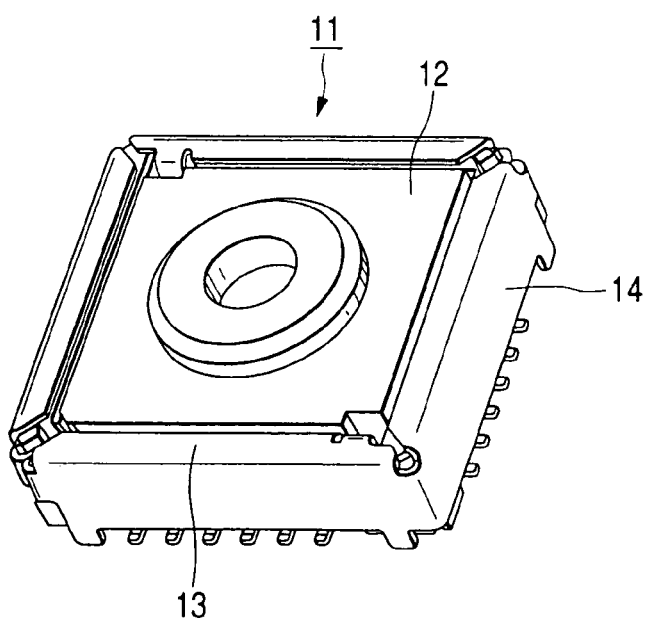
FIG. 6 is an overall perspective view showing a conventional connector for camera module use.
Figure 7A:
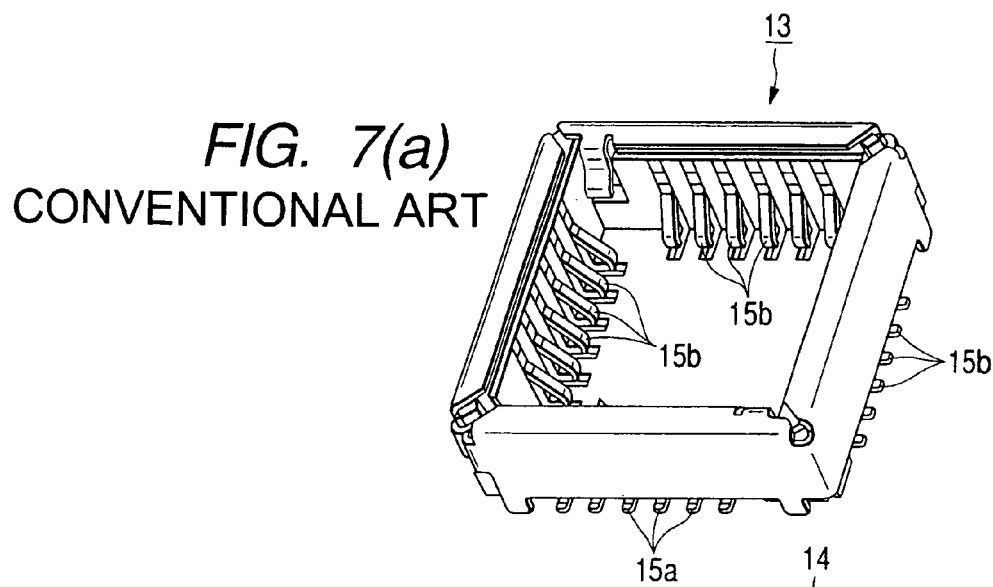
FIG. 7 is an assembled exploded perspective view of the connector for camera module use shown in FIG. 6.
Figure 7B:
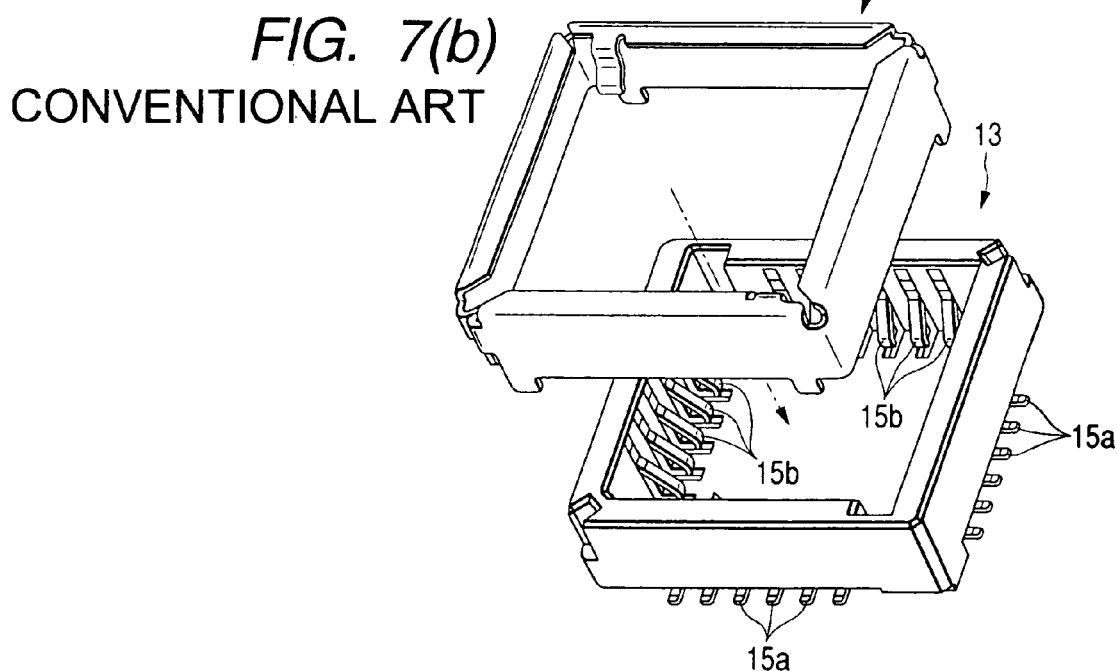
Figure 8:
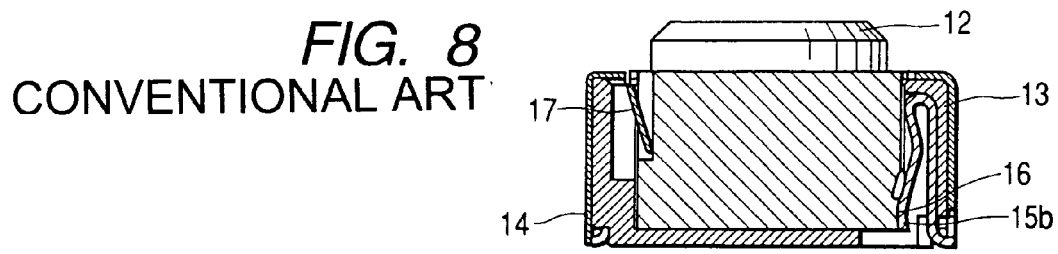
FIG. 8 is a sectional view showing a lock mechanism of the connector for camera module use shown in FIG. 6.

In the case where the terminals of the connector 20 for camera module use are mounted on a board (not shown) for camera module use, the camera module 12 is accommodated in the connector box 23, and the pins 26, 26 . . . of the connector box 23 and the contacts (not shown) of the camera module 12 are connected with each other and then the pushing member 21 is engaged with the shield connector 24 which covers and shields the connector box 23. At this time, while the lens unit (shown in FIG. 5) is being protruded from the opening portion 21a, the engaging holes 27, 27 formed on both side plates 21b, 21b of the pushing member 21 are engaged with the engaging protrusions 25, 25 of the shield case 24, and the pushing member 21 is engaged with the shield case 24. Due to the foregoing, the lens holder body (shown in FIG. 5) of the camera module 12 is pushed to the bottom face by the leaf springs 22, 22.

Therefore, the terminals of the camera module 12 and those of the connector box 23 can be strongly contacted with each other, and the occurrence of rattle can be avoided. Since the pushing force given to the camera module 12 is not limited to one directions, but a plurality of leaf springs 22, 22 . . . equally push the camera module 12. Therefore, the camera module can be stably set at a predetermined position, and the contacting state can be strongly and excellently held. Accordingly, there is no possibility that data of images, which have been picked up by the image pickup element of CMOS, are lost and deteriorated. Therefore, clear images can be picked up and transmitted.

Concerning the pushing member 21 used as a lock mechanism for locking the camera module 12 and the connector 20 for camera module use, the engaging protrusions 25, 25 of the shield case 24 and the engaging holes 27, 27 of the pushing member 21 strongly come into pressure contact with each other. Accordingly, there is no possibility that the camera module 12 is simply disengaged from the connector 20 for camera module use. Since the camera module 12 is not perfectly locked to the connector 20 for camera module use, when a defective camera module is found in the process of mounting, it is possible to replace the defective parts after the pushing member 21 has been detached.

EMBODIMENT 2

Next, referring to FIGS. 3 and 4, the second embodiment of the present invention will be explained in detail as follows.

Figure 3:
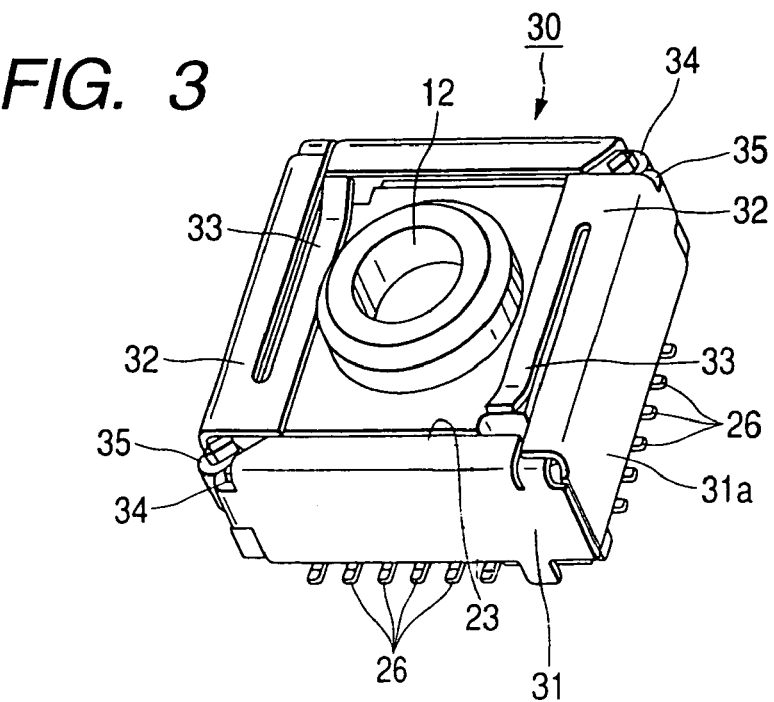
FIG. 3 is an overall perspective view of the connector for camera module use of the second embodiment of the present invention.

FIG. 3 is an overall perspective view of the connector for camera module use of the second embodiment of the present invention.

Figure 4:
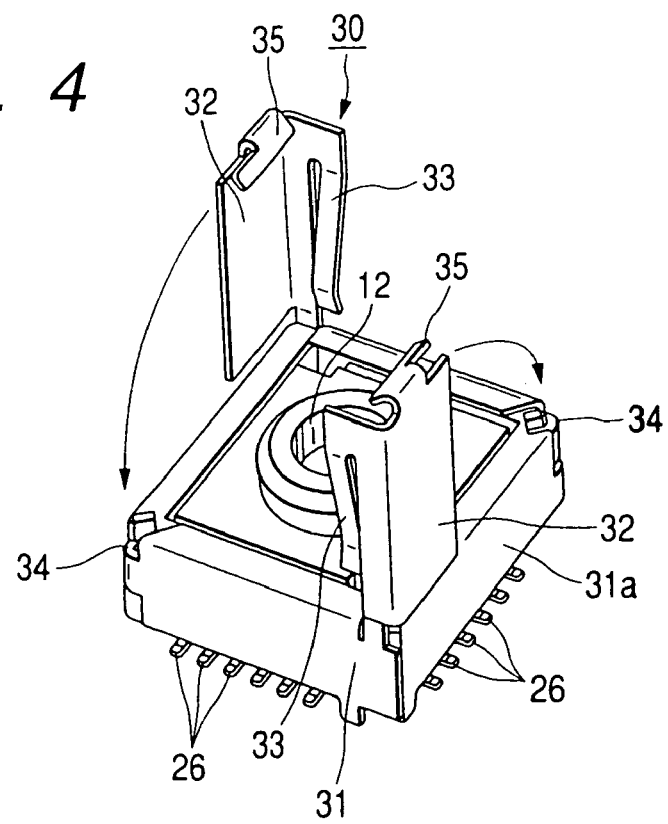
FIG. 4 is an assembled exploded perspective view of the connector for camera module use shown in FIG. 3.

FIG. 4 is an assembled exploded perspective view of the connector for camera module use shown in FIG. 3.

The connector 30 for camera module use shown in FIGS. 3 and 4 is composed as follows. The connector box 23 provided with the connector pins 26, 26 . . . is covered and shielded with the shield case 31, and the pushing members 32, 32, in which the same members as the shield case 31 are vertically arranged at the diagonal line corners like a pole and the leaf springs 33, 33 are protruded inside, are arranged and fixed on the circumferential side of the shield case 31 being bent.

The main bodies of the pushing members 32, 32 are arranged like a pole at the corners of the diagonal line by utilizing portions of the shield case 31. The leaf springs 33, 33 are protruded along the inside of the pushing members 32, 32. At the forward end portions of the pushing members 32, 32, the engaging members 35, 35 engaged with the engaging portions 34, 34 of the shield case 31 are formed. (In this connection, although the number of the leaf springs 33, 33 is two in the example shown in the drawings, the present invention is not limited to the above specific embodiment. It is possible to increase an intensity of the pushing force by increasing the number of the leaf springs.)

The pushing members 32, 32 are bent, making a right angle, to portions of the leaf springs 33, 33 and portions coming into close contact with the shield case sides 31a, 31a. Further, the pushing members 32, 32 are bent to the shield case sides 31a, 31a. Due to the foregoing, the engaging members 35, 35 of the pushing members 32, 32 are engaged with the engaging portions 34, 34 of the shield case 31, and the pushing members 32, 32 are closely contacted with the shield case sides 31a, 31a. In this way, the mold case body (shown in FIG. 5) of the lens holder of the camera module 12 is pushed to the bottom face by the leaf springs 33, 33.

Therefore, the pushing members 32, 32 are formed out of the same members as the shield case 31 which is integrated with the connector body 23 into one body. Since the engaging portions 34, 34 and the engaging members 35, 35 are engaged with each other, the pushing members 32, 32 and the shield case 31 are strongly connected with each other.

When the connector 30 for camera module use is mounted on a board (not shown) for camera module use, concerning the lock mechanism for locking the camera module 12 and the connector box 23 in the case where the camera module 12 is accommodated in the connector 30 for camera module use, since the camera module 12 is pushed to the bottom face from both sides by the leaf springs 33, 33, the pins and the contacts between the camera module 12 and the connector 30 for camera module use can be strongly contacted with each other, and the camera module can be stably fixed at the fixing position. Therefore, the excellent contacting position can be maintained, and clear images can be picked up and transmitted.

Since the pushing members 32, 32 are composed of the same member as the shield case 31 and conduct pushing by the leaf springs 33, 33, the number of parts can be reduced, which meets a recent demand of reducing the size of the camera module. Especially, the pushing members of the invention can be the most appropriately used for a small camera module. It is possible to increase the number of the pushing members 32, 32 so as to increase an intensity of the pushing force generated by the pushing members 32, 32.

In this connection, variations may be made by those skilled in that art without departing from the spirit and the scope of the claim of the present invention. Of course, the scope of the claim of the present invention covers the variations.

EMBODIMENT 3

Referring to the drawings, an embodiment of the present invention will be described in detail as follows.

Figure 9:
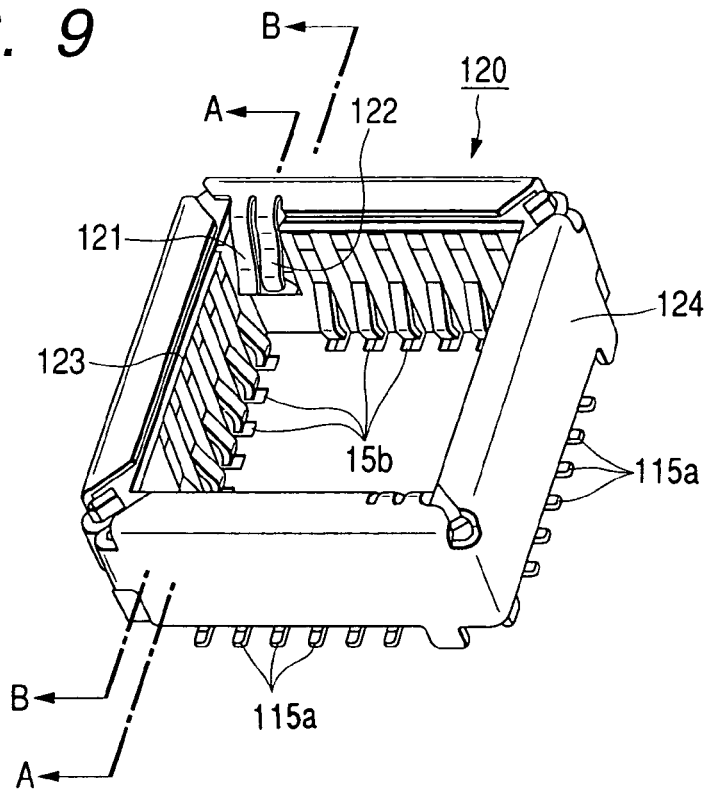
FIG. 9 is an overall perspective view of the connector for camera module use of an embodiment of the present invention.

FIG. 9 is an overall perspective view of the connector for camera module use of an embodiment of the present invention.

Figure 10:
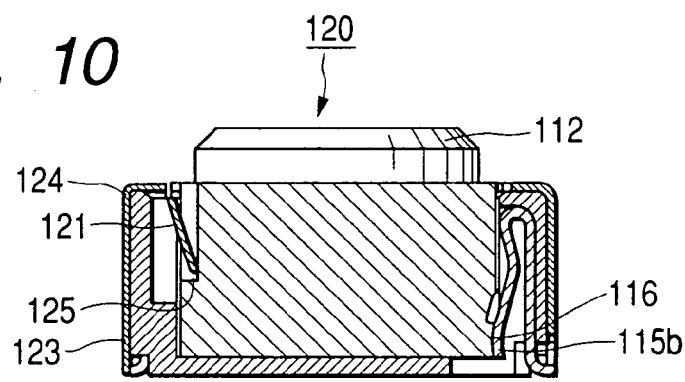
FIG. 10 is a sectional view of the connector for camera module use shown in FIG. 9 taken on line A—A.

FIG. 10 is a sectional view of the connector for camera module use shown in FIG. 1 taken on line A-A.

Figure 11:
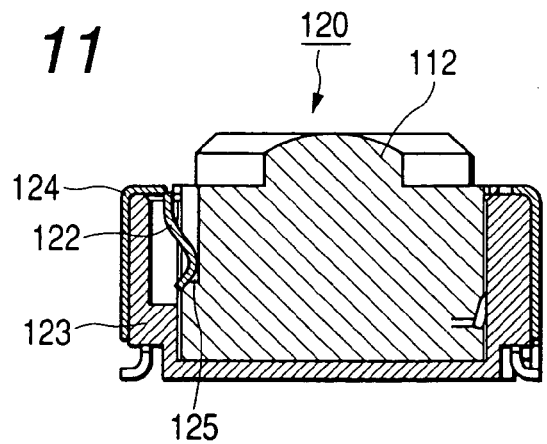
FIG. 11 is a sectional view of the connector for camera module use shown in FIG. 9 taken on line B—B.

FIG. 11 is a sectional view of the connector for camera module use shown in FIG. 1 taken on line B-B.

In FIG. 9, reference numeral 120 is a connector for camera module use. The connector 120 for camera module use is composed in such a manner that the connector box 123, to which the connector pins 115a, 115a . . . , 115b, 115b . . . are attached, is covered and fitted with the shield case 124 made of metal. The connector 120 for camera module use includes: an engaging member (lance: movable piece) 121, the shape of which is like a pin, arranged in an empty space between the connector pin 115b on the user side inner wall face and the corner, the engaging member protruding toward the lower side, the engaging member being made by utilizing the same member as the shield case 124; and a pushing member 122 arranged on the side of the lance 121, protruding in the same pin shape as that of the lance, the forward end portion of the pushing member 122 being bent downward so as to provide an elastic force in the direction to the lower side, wherein the connector 120 for camera module use composes a two stage lock system.

When the connector 120 for camera module use is mounted on a board (not shown) used for the camera module, in the case were the camera module is accommodated and fixed in the connector 120 for camera module use, as shown in FIG. 10, the lance 121 described before is engaged with the engaging face 125 of the camera module 112. Therefore, the camera module 112 body is strongly pushed in the horizontal direction and completely locked. Although a pushing force in the horizontal direction generated by the lance 121 in the lock mechanism is strong, a pushing force in the vertical direction is not so strong compared with the pushing force in the horizontal direction. Accordingly, there is a possibility that a vertical movement (rattle) is caused because the gaps are formed in the vertical direction between the connector 120 for camera module use and the camera module 112.

However, as shown in FIG. 11, when the pushing member 122, the forward end portion of which is bent downward into a substantial S-shape so that it can be used as a lock mechanism, is provided together with the lance 121 and the forward end portion of the pushing member 122 is engaged with the engaging face 125 of the camera module 112, a forward end face of the pushing member 122 pushes the engaging face 125 downward by an elastic force, so that the camera module 112 can be pushed to the bottom face. Accordingly, no rattle is caused between the camera module 112 and the connector 120 for camera module use, that is, the camera module 112 and the connector 120 for camera module use can be stabilized. In this connection, the shape of the pushing member 122, the substantial S-shape is shown in FIG. 11, however, the shape of the pushing member 122 is not limited to the above specific embodiment. For example, a C-shape, in which the forward end portion is bent to the left in the drawing, may be adopted. As long as a pushing force in the lower direction can be provided in the state of half lock, any shape may be adopted.

As described above, two-stage locking is conducted by the lance 121 and the pushing member 122. Therefore, it is possible to avoid the generation of gaps between the camera module 112 and the connector 120 for camera module use in both the horizontal and the vertical direction, and the pins and the contacts provided between the camera module 112 and the connector 120 for camera module use can be strongly contacted with each other and the camera module 112 can be stably held in the connector 120 for camera module use. Therefore, when the connector 120 for camera module use is mounted on a board (not shown) used for the camera module, the working property can be enhanced and clear images can be always picked up by the camera module.

In this connection, variations may be made by those skilled in that art without departing from the spirit and the scope of the claim of the present invention. Of course, the scope of the claim of the present invention covers the variations.

What is claimed is:

1. A connection structure, comprising:
a connector, having an inner side face defining a chamber formed with a first opening and having an outer side face opposed to the inner side face;
a module body, inserted from the first opening in a first direction to be accommodated in the chamber; and
a shield case,
wherein at least one first engaging member is provided on the shield case;
wherein at least one second engaging member is provided on the shield case so as to be pivotable between a first position, and a second position the second engaging member being integrally formed with a first elastic member;
the at least one second engaging member is engaged with the at least one first engaging member at the first position so that the first elastic member presses the module body to the connector in the first direction when the second engaging member is placed in the first position; and
the second engaging member is disengaged from the first engaging member when the second engaging member is placed in the second position.

2. The connection structure according to claim 1, wherein the module body is a camera module body.

3. The connection structure according to claim 1, wherein said at least one second engaging member is substantially L-shaped.

4. The connection structure according to claim 1, wherein said at least one first engaging member includes at least two engaging members on opposite sides of said connector.

5. The connection structure according to claim 1, wherein said at least one second engaging member includes at least two engaging members on opposite sides of said connector.

6. A connection structure, comprising:
a connector, having an inner side face defining a chamber formed with a first opening and having an outer side face opposed to the inner side face; and
a module body, inserted from the first opening in a first direction to be accommodated in the chamber and wherein the module body comprises an outer face formed with a recess;
a shield case formed with a second opening located so as to overlap with the first opening comprising at least one first elastic member is extending in the first direction from an edge of the second opening so as to engage with the recess of the module body such that the first elastic member presses the module body to the connector in the first direction; and
a lance extending in a first direction to contact with said recess.

7. The connection structure according to claim 6, wherein said lance is located adjacent to said first elastic member.

8. The connection structure according to claim 6, wherein said first elastic member is substantially S-shaped.

9. The connection structure according to claim 6, wherein the module body is a camera module body.

10. A connection structure, comprising:
a connector, having an inner side face defining a chamber formed with a first opening and having an outer side face opposed to the inner side face;
a module body, inserted from the first opening in a first direction to be accommodated in the chamber and wherein the module body comprises an outer face formed with a recess;
a shield case formed with a second opening located so as to overlap with the first opening comprising at least one lance extending in the first direction from an edge of the second opening so as to engage with the recess of the module body; and
a pushing member,
wherein said pushing member comprises an opening portion formed at the center of an upper face, at least one first elastic member protruding along an inner edge of said opening portion, and at least two opposing side plates which are connectable to said shield case, and
wherein said first elastic member engages with the recess of the module body.

11. The connection structure according to claim 10, wherein at least one first engaging member is provided on the shield case,
wherein at least one second engaging member is provided on the shield case so as to be pivotable between a first position and a second position the second engaging member being integrally formed with a first elastic member,
wherein the at least second engaging member is engaged with the at least one first engaging member at the first position so that the first elastic member presses the module body to the connector in the first direction when the second engaging member is placed in the first position, and
wherein the second engaging member is disengaged from the first engaging member when the second engaging member is placed in the second position.

* * * * *